March 28, 1939. H. J. MURPHY 2,152,601

WINDOW STRIP INSTALLATION AND FASTENER FOR THE SAME

Filed March 30, 1937

Inventor:
Howard J. Murphy.
by Walter S. Jones Att'y.

Patented Mar. 28, 1939

2,152,601

UNITED STATES PATENT OFFICE 2,152,601

WINDOW STRIP INSTALLATION AND FASTENER FOR THE SAME

Howard J. Murphy, Greenwood, Mass., assignor to United-Carr Fastener Corporation, Cambridge, Mass., a corporation of Massachusetts Application March 30, 1937, Serial No. 133,836

7 Claims. (Cl. 24—213)

My invention relates to an improved fastener member for attaching a window guide strip or the like to a supporting structure and to installations of the same.

Referring to the drawing, in which I have illustrated a preferred embodiment of my invention:

The object of my invention is to provide a simple and inexpensive means for attaching a flexible strip or the like to a supporting structure. My invention is particularly useful as a means for securing a flexible strip used in connection with an automobile window installation to the framework of the window channel. By reason of the fact that my improved fastener member may be used most advantageously for the purpose of attaching a window guide strip to a supporting structure, I prefer to describe it in connection with such an installation although there are many other uses to which my fastener could be directed which would fall within the spirit of this invention.

Figure 1:
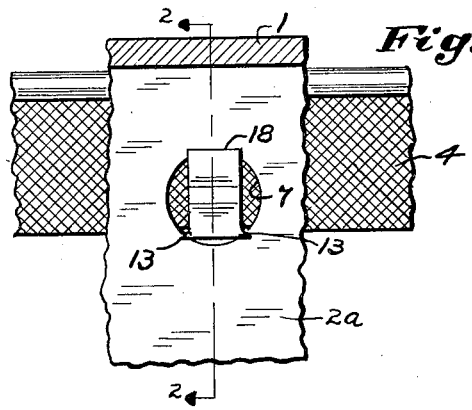
Figure 1 is a bottom view of a portion of my improved fastener installation including a portion of a support and a portion of a window guide strip secured to the support by means of my improved fastener member.
Figure 2:
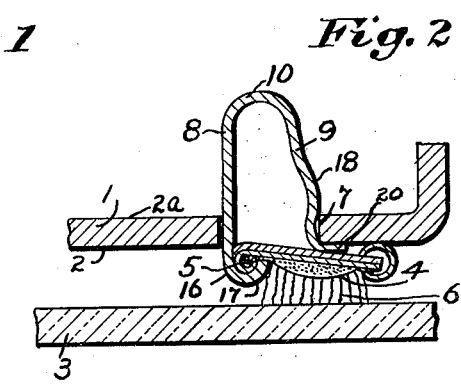
Fig. 2 is a section taken along the line 2—2 of Fig. 1 and including a portion of a window pane, which is also shown in section.

Referring to Figs. 1 and 2, which illustrate the preferred use of my invention, I have shown a fragment of a window channel frame in the form of a supporting structure 1 providing a lower surface 2 which bounds one side of the channel through which a window pane 3 (Fig. 2) is moved during raising and lowering of the same. A flexible strip 4, a portion of which is shown in Figs. 1, 2, 4, 5, and 6, is attached to the support 1 and positioned so as to seal, in an effective manner, the passage between the lower surface 2 of the support and the window pane, (Fig. 2) as will be understood by those skilled in the art. Any suitable strip may be used, but in my preferred installation I have shown a strip having a beading 5 extending along one lateral edge thereof and adapted to be clamped against the surface 2 of the support 1 by a portion of my fastener member (Figs. 2 and 6) for securing the strip to the support, as will be hereinafter described. A nap means 6 is provided on that side of the strip facing the pane 3, as most clearly illustrated in Fig. 2. The strip 4 is attached to the support 1 by means of my improved fastener members which are provided with a resilient shank extending through a substantially circular aperture 7 of the support 1 and having portions engaging an upper surface 2ᵃ of the material of the support adjacent the aperture.

Figure 8:
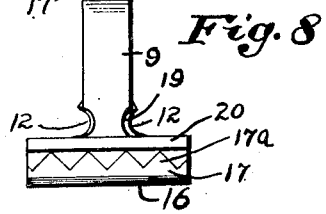
Fig. 8 is a rear edge view of the fastener member shown in Fig. 7.
Figure 10:
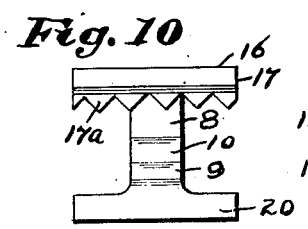
Fig. 10 is a plan view of my fastener member per se taken from the opposite direction from Fig. 7.
Figure 9:
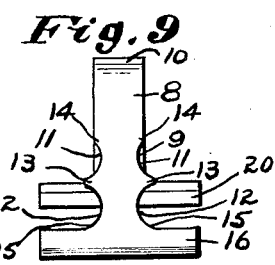
Fig. 9 is a front, partly tipped view of the fastener.

Referring in detail to my preferred fastener member per se, I have shown in the figures a fastener made of one piece of sheet metal having a resilient shank comprising legs 8 and 9 of ribbon-like material connected at one end to form a nose 10. Two pairs of oppositely disposed notches 11—11 and 12—12 are cut in the narrow edges of the leg 8 with the opposed notches 12—12 adjacent the free end of the leg. As a result of this construction, shoulders 13 are provided on each narrow edge of the leg 8 intermediate the respective notches 11 and 12 formed in that edge (Fig. 9). In my preferred form the portions 13—13 extend laterally beyond the normal narrow edges of the leg 8 (Fig. 9) providing shoulders adapted to engage a surface of the support 1. Material at the narrow edges of the leg 8 adjacent the end of the notches 11—11 on the same side of the notches as the nose 10 provides shoulders 14—14 (Fig. 9) for a purpose which will be described. Also, material at the narrow edges of the leg 8 adjacent the notches 12—12 at those ends of the notches adjacent the free end of the leg is flared outwardly, in my preferred form, providing shoulders 15—15 (Figs. 3 and 9) adapted to engage an opposite surface of the support 1 from the shoulders 13—13 when the fastener is in final assembly with the support. At the free end of the leg 8, adjacent the outermost end of the notches 12—12, I have provided a base portion 16 which is of greater width than the free end of the leg 8 so as to provide a relatively wide gripping portion. Material at the outermost end of the base 16 extends laterally inwardly relative to the normal plane of the leg 8 providing a clamping portion 17 which may be provided with prongs 17ᵃ at its outermost free end to provide a more secure gripping means on the strip 4. Referring to the leg 9, a portion of the leg adjacent the free end is preferably bowed in a direction away from the leg 8 providing a shoulder 18 adapted to engage the same face of the support 1 as that engaged by the shoulder portions 13—13 after the fastener has been finally secured to the support. A reduced portion 19 (Fig. 8) is preferably provided at the free end of the leg 9 so as to shorten the arc taken by the width of the leg relative to the aperture 7 when the leg is in final attaching position with the support. A flange 20, which is preferably of greater width than the leg 9, is provided adjacent the outermost end of the reduced portion 19 and extends in substantially perpendicular relation relative to the normal plane of the leg. The flange 20 is adapted to engage the same face of the support 1 as the shoulders 15—15 of the base portion 16 when the fastener is in final assembly with the support.

Figure 3:
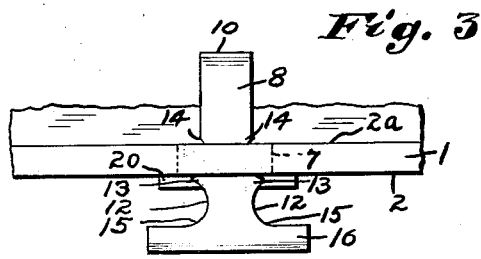
Fig. 3 is an edge view showing the method of securing the fastener member to a support.
Figure 4:
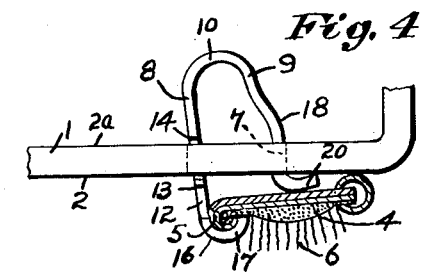
Fig. 4 is a side view of the parts in the position shown in Fig. 3 showing the method of securing the window guide strip to the support.
Figure 5:
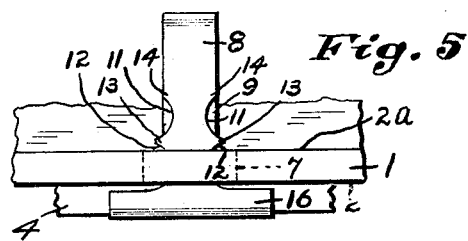
Fig. 5 is an edge view showing my fastener in final attachment with the support.
Figure 6:
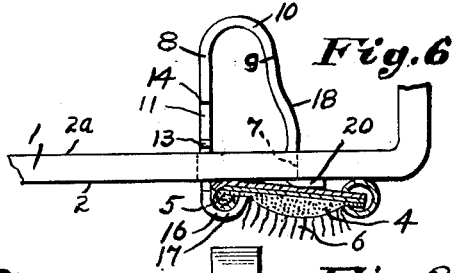
Fig. 6 is a side view of my fastener member in final attachment with the support and a window guide strip firmly secured to the support by means of my fastener member.
Figure 7:
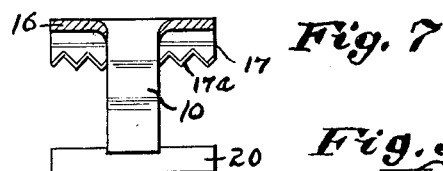
Fig. 7 is a plan view of my fastener member per se.

In assembling the parts of my installation, the nose 10 of the fastener is moved through the aperture 7 of the support 1 from a position outside the face 2 of the support until the fastener is in the first, or strip-receiving, position shown in Figs. 3 and 4. As a result of the fact that the distance between the arms 8 and 9 is greater than the diameter of the aperture 7, the arms will contract slightly while the fastener is being extended through the aperture so as to engage resiliently opposed walls of the aperture 7. When the fastener is in the aforementioned first position, the outer corners of the material adjacent the narrow edges of the oppositely disposed notches 11—11 engage the wall surrounding the aperture 7, and through reason of the fact that the notches 11—11 shorten the arc of the width of the leg 8 relative to the aperture, the shoulder portions 13—13 engage material of the lower surface 2 of the support 1 adjacent the aperture 7 and the shoulders 14—14 engage material of the upper surface 2ᵃ of the support adjacent the aperture, as most clearly shown in Fig. 3, whereby the shoulders 13—13 and 14—14 cooperate to maintain the fastener member in said first position. At the same time the upper corner of the flange 20 at its outermost free edge engages the lower surface of the support 1, as most clearly shown in Fig. 4. The strip 4 is now moved into position with the fastener member so that the bead 5 is engaged by the clamping portion 17 at the free end of the base 16, as most clearly shown in Fig. 4.

In moving the fastener into final position for securing the strip to the support, pressure is exerted on the arm 8 by a suitable tool to move the arm 8 outwardly away from the material of the support adjacent the aperture 7 and inwardly until the shoulder portions 16—16 engage the lower surface 2 of the support, at which time the bead 5 will be clamped adjacent the lower surface 2 of the support so as to secure firmly the strip to the same. When the fastener is in the aforementioned final position, the shoulders 13—13 of the leg 8 and the shoulder 18 of the leg 9 engage the upper surface 2ᵃ of the support 1 adjacent the aperture 7 so as to prevent unintentional withdrawal of the fastener from the support in the direction of the window pane. It will be noticed that in the second position of the fastener the upper broad surface of the flange 20 lies adjacent the face 2 of the support 1 while the lower broad surface of the flange 20 is adjacent the other side of the strip 4 from that having the nap means 6.

It is obvious that any number of fastener members may be used to attach the strip to the support, but it is necessary that a corresponding number of apertures be located in correct position in the support to receive the resilient shanks of the fasteners.

Thus by my invention I have provided a novel fastener member of inexpensive construction which may be easily assembled with a support and which is provided with efficient means for clamping a strip to a face of the support whereby it may be maintained in secure assembly therewith.

Although I have illustrated and described a preferred form of my invention, I do not wish to be limited thereby because the scope of my invention is best set forth in the following claims.

I claim:

1. A fastener member having a resilient shank comprising legs of ribbon-like material connected at their leading ends, one of said legs having a pair of oppositely disposed notches in the narrow edges thereof adjacent the free end, material at the narrow edges of said leg adjacent the ends of said notches away from said free end providing shoulders adapted to engage the upper surface of a supporting part adjacent an aperture in said part, portions adjacent the ends of said notches toward said free end adapted to engage a lower surface of said support, a base portion at the free end of said leg, said base portion having a laterally extending clamping portion at the outermost end thereof for clamping an article against a face of said support, said other leg having a portion for resiliently engaging the material adjacent said aperture, and a laterally extending portion at the free end of said last-mentioned leg.

2. A fastener member having a resilient shank comprising legs of ribbon-like material connected at their leading ends, said legs being disposed in opposite relation one to another, one of said legs having two notches in at least one of the narrow edges thereof, material at the narrow edges of said leg between said notches being adapted to engage the material adjacent an aperture of a supporting part, a laterally extending portion at the free end of said last-mentioned leg adapted to clamp an article against a surface of said support and a laterally extending portion at the free end of the other of said legs.

3. A fastener member having a resilient shank comprising legs of ribbon-like material connected at their leading ends, one of said legs having two pairs of oppositely disposed notches in the narrow edges thereof, one of said pairs of oppositely disposed notches being adjacent the free end of said leg, material at the narrow edges of said leg between said notches providing shoulders adapted to engage the material of an upper surface of a supporting part adjacent an aperture in said part, portions at the ends of said notches adjacent said free ends adapted to engage a lower surface of said support, a base portion at the free end of said last-mentioned leg, said base portion being of greater width than said last-mentioned leg, and said base portion having a laterally extending clamping portion at the outermost end thereof for clamping an article against said lower surface of said support, and a laterally extending portion at the free end of said first-mentioned leg adapted to engage said lower surface of said support.

4. A fastener member having a resilient shank comprising legs of ribbon-like material connected at their leading ends, one of said legs having two pairs of oppositely disposed notches in the narrow edges thereof, one of said pairs of oppositely disposed notches being adjacent the free end of said leg, material at the narrow edges of said leg between the notches in said respective leg providing shoulders for engagement with the material of the upper surface of a supporting part adjacent an aperture of said supporting part, said leg having portions at its free end adapted to engage a lower surface of said support, a base portion at the free end of said last-mentioned leg, said base portion having a laterally extending clamping portion at the outermost end thereof for clamping an article against said lower surface of said support, said other leg having a portion resiliently engaging the material of said support adjacent said aperture, and a laterally extending portion at the free end of said last-mentioned leg adapted to engage a surface of said support.

5. A fastener member having a resilient shank comprising legs of ribbon-like material connected at their leading ends, one of said legs having two pairs of oppositely disposed notches in the narrow edges thereof, one of said pairs of oppositely disposed notches being adjacent the free end of said leg, material at the narrow edges of said leg between the notches in said respective edges providing shoulders for engagement with the material adjacent an aperture of a supporting part, said other leg having a shoulder means extending beyond the plane of the outer broad surface of said leg, said last-mentioned shoulder being adjacent the free end of said leg, a base portion at the free end of said notched leg, said base portion having a greater width than said last-mentioned leg, and said base portion having a laterally extending clamping portion at the outermost end thereof for clamping an article against a surface of said support, and a laterally extending portion at the free end of said other leg adapted to engage a surface of said support.

6. A fastener member having a resilient shank comprising legs of ribbon-like material connected at their leading ends, one of said legs having two pairs of oppositely disposed notches in the narrow edges thereof, one of said pairs of oppositely disposed notches being adjacent the free end of said leg, material at the narrow edges of said leg between the notches in said respective edges extending laterally beyond the normal narrow edges of said leg providing shoulders for engagement with the material adjacent an aperture of a supporting part, said other leg having a shoulder means extending beyond the plane of the outer broad surface of said leg, a reduced portion adjacent said shoulder means at the outermost free end of said last-mentioned leg, a base portion at the free end of said notched leg, said base portion having a greater width than said last-mentioned leg and having a laterally extending clamping portion at the outermost end thereof for clamping an article against a surface of said support, and a support-engaging portion at the free end of the reduced portion of said other leg.

7. A snap fastener of the class described having a yieldable shank, a clamping portion at one end of said shank for clamping an article against a support, said shank having two support-engaging legs arranged so that said shank may take two positions during extension through an aperture in said support, one of said legs having a single support-engaging neck and the other having at least two sets of notches in opposed edges of the leg to provide said two positions.

HOWARD J. MURPHY.